(12) United States Patent
Gupta et al.

(10) Patent No.: US 11,255,310 B2
(45) Date of Patent: Feb. 22, 2022

(54) WIND TURBINE NOISE ANALYSIS AND CONTROL

(71) Applicant: VESTAS WIND SYSTEMS A/S, Aarhus N (DK)

(72) Inventors: Mranal Gupta, Tilst (DK); Niels Christian M. Nielsen, Spjald (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 216 days.

(21) Appl. No.: 16/349,239

(22) PCT Filed: Nov. 13, 2017

(86) PCT No.: PCT/DK2017/050373
§ 371 (c)(1),
(2) Date: May 10, 2019

(87) PCT Pub. No.: WO2018/086671
PCT Pub. Date: May 17, 2018

(65) Prior Publication Data
US 2019/0271295 A1    Sep. 5, 2019

(30) Foreign Application Priority Data

Nov. 13, 2017   (DK) .......................... PA 2016 70905

(51) Int. Cl.
*F03D 7/02*    (2006.01)
*F03D 17/00*   (2016.01)

(52) U.S. Cl.
CPC ............. *F03D 7/0296* (2013.01); *F03D 7/02* (2013.01); *F03D 7/0276* (2013.01); *F03D 17/00* (2016.05);
(Continued)

(58) Field of Classification Search
CPC ........ F03D 7/02; F03D 7/0296; F03D 7/0276; F03D 17/00; F05B 2270/101; F05B 2270/333; Y02E 10/72
See application file for complete search history.

(56) References Cited

U.S. PATENT DOCUMENTS 6,785,637 B1 *   8/2004  Wobben ................. F03D 7/042
                                                        702/188
7,239,738 B2 *   7/2007  Yasukawa ............... G06T 7/001
                                                        382/141
(Continued)

FOREIGN PATENT DOCUMENTS

CN    101265878 A    9/2008
CN    103797244 A    5/2014
(Continued)

OTHER PUBLICATIONS

Chinese Office Action for Application No. 201780083342.6 dated May 15, 2020.
(Continued)

*Primary Examiner* — David E Sosnowski
*Assistant Examiner* — Wayne A Lambert
(74) *Attorney, Agent, or Firm* — Patterson + Sheridan, LLP

(57) ABSTRACT

A method of identifying an operating parameter of a wind turbine that contributes to the generation of tonal noise. The method comprises acquiring operating parameter data associated with a plurality of operating parameters of the wind turbine. The operating parameter data comprises a set of values for each operating parameter of the wind turbine. Noise data is also acquired that includes tonal noise produced by the wind turbine and is synchronised with the operating parameter data. The noise data is then binned with respect to a set of operating parameter values of a first operating parameter, and, for each of one or more of the
(Continued)

bins, the noise data in the bin is analysed with respect to a set of values of a second operating parameter. The method then determines if there is a relationship between the second operating parameter and tonal noise produced by the wind turbine based on the analysis.

16 Claims, 5 Drawing Sheets

(52) U.S. Cl.
    CPC ... *F05B 2270/101* (2013.01); *F05B 2270/333* (2013.01); *Y02E 10/72* (2013.01)

(56) References Cited

U.S. PATENT DOCUMENTS

| | | | |
|---|---|---|---|
| 7,883,317 B2* | 2/2011 | Ormel | F03D 7/02 416/1 |
| 7,902,689 B2* | 3/2011 | Kinzie | F03D 7/028 290/55 |
| 8,021,110 B2 | 9/2011 | Kerber | |
| 11,022,092 B2* | 6/2021 | Pedersen | B66C 1/108 |
| 11,105,316 B2* | 8/2021 | Gupta | F03D 80/60 |
| 2004/0151578 A1* | 8/2004 | Wobben | F03D 17/00 415/4.1 |
| 2007/0031237 A1* | 2/2007 | Bonnet | F03D 7/048 415/1 |
| 2008/0164091 A1 | 7/2008 | Kerber | |
| 2009/0039650 A1* | 2/2009 | Nies | F03D 80/40 290/44 |
| 2010/0133818 A1 | 6/2010 | Kinzie et al. | |
| 2011/0084485 A1* | 4/2011 | Miranda | F03D 7/042 290/44 |
| 2011/0135442 A1* | 6/2011 | Kerber | F03D 17/00 415/1 |
| 2012/0061957 A1* | 3/2012 | Steinmetz | F03D 7/043 290/44 |
| 2014/0193257 A1 | 7/2014 | Ormel et al. | |
| 2014/0327243 A1 | 11/2014 | Demtroder | |
| 2014/0377065 A1* | 12/2014 | Matesanz | F03D 7/0296 416/1 |
| 2020/0182224 A1* | 6/2020 | Gupta | F03D 7/0296 |
| 2021/0048006 A1* | 2/2021 | Ramirez | F03D 80/88 |

FOREIGN PATENT DOCUMENTS

| | | | | |
|---|---|---|---|---|
| CN | 105337283 A | | 2/2016 | |
| EP | 2461025 A2 | * | 6/2012 | ........... F03D 7/0224 |
| JP | 2014506971 A | * | 3/2014 | |
| WO | WO-03064853 A1 | * | 8/2003 | ........... F03D 7/0296 |
| WO | 2017198270 | | 11/2017 | |
| WO | 2018086671 | | 5/2018 | |

OTHER PUBLICATIONS

Danish Patent and Trademark Office First Technical Examination for Application No. PA 2016 70905 dated May 11, 2017.
PCT international Search Report for Application No. PCT/DK2017/05373 dated May 2, 2018.
PCT Written Opinion of the International Searching Authority for Application No. PCT/DK2017/050373.

* cited by examiner

WIND TURBINE NOISE ANALYSIS AND CONTROL

TECHNICAL FIELD

The present invention relates to the analysis of noise emission from wind turbines, and particularly to tonal noise emission, and also to subsequent control of the wind turbine based on the analysis.

BACKGROUND

Noise emission from wind turbines is a well-known problem and has been the subject of extensive work. The procedure for measuring wind turbine acoustic noise is described in the third edition of international standard IEC 61400-11.

The noise emission from a wind turbine includes both mechanical noise, and aerodynamic noise. Mechanical noise includes noise driven by components within the nacelle, such as the wind turbine drivetrain. Such noise can be radiated to the surroundings directly from the surface of vibrating components (so-called airborne noise) or can be radiated to the surroundings by the wind turbine tower or blades when vibrations of components are conducted through the structure of the wind turbine (so-called structure borne noise (SBN)). Aerodynamic noise comes from the wind turbine blades and includes, for example, noise due to vortex-shedding.

The spectrum of noise produced by a wind turbine includes both broadband noise and noise at distinct frequencies. Noise at distinct frequencies, known as tonal noise, is often perceived as more annoying to wind turbine neighbours and is more likely to be the subject of noise complaints. Unfortunately, it is difficult to predict when a wind turbine will produce tonal noise and the generation of tonal noise can depend on a variety of different operating parameters and conditions of the wind turbine. This in turn makes it difficult to evaluate and act on noise complaints made by neighbours, and to adjust the operation of wind turbines to avoid or reduce the production of tonal noise.

Existing methods for analysing the noise spectrum produced by a wind turbine are unsatisfactory in relation to identifying tonal noise contained within the noise spectrum and identifying the particular operating parameters of the wind turbine that are causing the tonal emission. For example, the existing IEC standard for analysing noise data is too broad, does not effectively identify regions of tonal noise and does not allow any association of the tonal noise to operating parameters. Further, according to the IEC standard, not all spectra of the noise data are evaluated, and only some kind of percentage is needed. For example, if the tone is strongly present in only 30% of the spectra, then the standard will report a high value for tonal audibility even if it is completely absent in the remaining 70%.

SUMMARY OF THE INVENTION

The need to improve upon existing techniques for analysing noise emission data from wind turbines has been appreciated. In particular, provided is a method of analysing noise emission from wind turbines that identifies tonal noise in a spectra of noise data and identifies the operating parameters of the wind turbine that are responsible for the generation of the tonal noise. The method can also be used to identify the components responsible for tonal noise as well, especially in cases when there are sidebands. This is advantageous because the IEC standard associates a broad frequency range as tone of the same origin, which is not always the case. The tonal noise analysis can then be used in adjusting operating parameters of the wind turbines to avoid operating parameter values that result in tonal noise, or to add masking noise.

The invention is defined in the independent claims to which reference is now directed. Preferred features are detailed in the dependent claims.

According to a first aspect of the present invention, there is provided a method of identifying an operating parameter, and potentially also a component, of a wind turbine that contributes to the generation of tonal noise. The method comprises acquiring operating parameter data associated with a plurality of operating parameters of the wind turbine, wherein the operating parameter data comprises a set of values for each operating parameter of the wind turbine, and wherein the operating parameter data was obtained during operation of the wind turbine. The method further comprises acquiring noise data that includes tonal noise produced by the wind turbine and is synchronised with the operating parameter data. The method further comprises binning the noise data with respect to a set of operating parameter values of a first operating parameter, such as generator RPM, and for each of one or more of the bins, analysing the noise data in the bin with respect to a set of values of a second operating parameter, such as pitch, power/torque etc., and determining if there is a relationship between the second operating parameter and tonal noise produced by the wind turbine based on the analysis.

This method is an improvement on existing standards. For example, the IEC standard bins only with respect to wind speed and only with a bin width of 0.5 m/s, which does not allow analysis to be performed on different operating parameters. Such binning is too broad, the bin widths do not correlate well with tonal generation, and such binning does not allow i) effective identification of areas of noise data associated with unacceptable tonal noise and ii) any association between the unacceptable noise generation and the parameters of the turbine that may be causing such generation. In contrast, embodiments of the present invention bin with respect to a first operating parameter and then analyse the noise data individually with respect to a second operating parameter. This allows for the identification of exactly where the tonal noise lies in relation to the parameter values as well as for the correlation of the tonal noise with the parameter that generated it.

The methodology described allows determining of where the tonal noise is in the operation of the turbine, together with identification of the source(s) of the tonal noise. Through the method, "hot-spots", or regions of interest, are determined for different sources within different turbine operation areas. A correlation analysis inside the "hot-spot" area for identification of critical tonally sensitive operational parameters can then be applied. The method also provides more precise information into the operational areas where improvements to certain components (source components) are needed. The method may help in identifying the real "hot-spots" of turbine operational parameters, such that a solution can be provided, by turbine control, or physical component improvements or otherwise, so that neighbours are not subjected to the same level of annoying tonal noise.

The binning of the above aspect may further comprise identifying a range in the set of parameter values of the first operating parameter. The range may be determined by the set of values of at least one of the plurality of operating parameters. Further, the method may then set each bin equal to the range. This feature allows bins of optimum width to be calculated which provides greater efficiency when identifying tonal noise in the noise data and correlating the tonal noise generation with an operating parameter of the wind turbine.

The analysis with respect to the set of values of the second operating parameter according to the first aspect may further comprise identifying a sub-set of parameter values of the second parameter. The sub-set of parameter values may be the values that are associated with the bin. Further, the variation of the sub-set of parameter values is analysed and compared with a variation in the noise data of the bin. A correlation between the variation of the sub-set of parameter values and the variation in the noise data is then determined. This allows a finer analysis of the correlation between the second parameter and tonal noise.

This may further comprise calculating a correlation coefficient based on the comparison, wherein the correlation coefficient indicates the correlation between the variation of the sub-set of parameter values of the second parameter and the variation in the noise data in the bin. In addition, determining if the second parameter contributed to the generation of the noise values indicative of tonal noise further comprises setting a predetermined condition, such as a threshold, for the correlation coefficient and determining that the second parameter contributed to the generation of the noise values indicative of tonal noise if the correlation coefficient meets the predetermined condition, such as exceeding the threshold, and determining that the sub-set of parameter values of the second parameter are a source or driver of the tonal noise generation. These component values (i.e. the sub-set of parameter values of the second parameter) are parameter values, which are a source and/or driver for the generation of tonal noise for a given bin. The turbine component (e.g. a gearbox, generator, fan etc.) associated with the parameter may be described as a source component.

The method may further comprise controlling the wind turbine by adjusting an operating parameter of the wind turbine based on the analysis such that the operating parameter values of the second operating parameter are not sources (i.e. such that they are no longer a source or driver of tonal noise). The tonal noise (Lpt) may be reduced by altering the operation strategy (adaptive control), by varying pitch and/or rpm (and indirectly power) for example. Alternatively, or in addition, the controlling the wind turbine may comprise adjusting an operating parameter of the wind turbine based on the analysis such that the masking noise of the wind turbine is increased. Masking noise (Lpn) may be increased by means of the turbine itself (adaptive control) or add-ons.

These features provide a robust method for correlating identified tonal noise data with the parameters that are contributing to its generation.

The first operating parameter of the first aspect may be RPM. A wind turbine is tonally sensitive with RPM and therefore this allows for easy identification of tonal noise. Thus, RPM is a good parameter to use for the binning. However, other parameters may be used, with examples being described herein.

The method may further comprise determining whether a region of the noise data contains noise data indicative of tonal noise. This may be achieved by dividing the entire operational area (or a selected portion of it) of the turbine into bins of different parameters. If a region of data binned according to a particular parameter contains noise data indicative of tonal noise, the region may be set equal to a candidate region. This may be performed by determining a mean maximum tone level (as an example) for each bin of a given parameter. These values are then compared against a corresponding predetermined condition, such as a threshold. The regions of data for which a predetermined condition are met (e.g. a threshold is exceeded) are set equal to candidate regions. The threshold may be a maximum permissible tone level (as an example) for a given bin and a candidate region may comprise one or more bins. Further, the method may include only analysing the noise data in the one or more bins with respect to the set of values of the second operating parameter if the bin is in a candidate region. In this way, only relevant data is considered, reducing the amount of data that needs to be analysed and thus reducing computational expenditure.

BRIEF DESCRIPTION OF THE DRAWINGS

Examples of the invention will now be described in more detail with reference to the accompanying drawing in which.

DETAILED DESCRIPTION OF PREFERRED EMBODIMENTS

Figure 1:
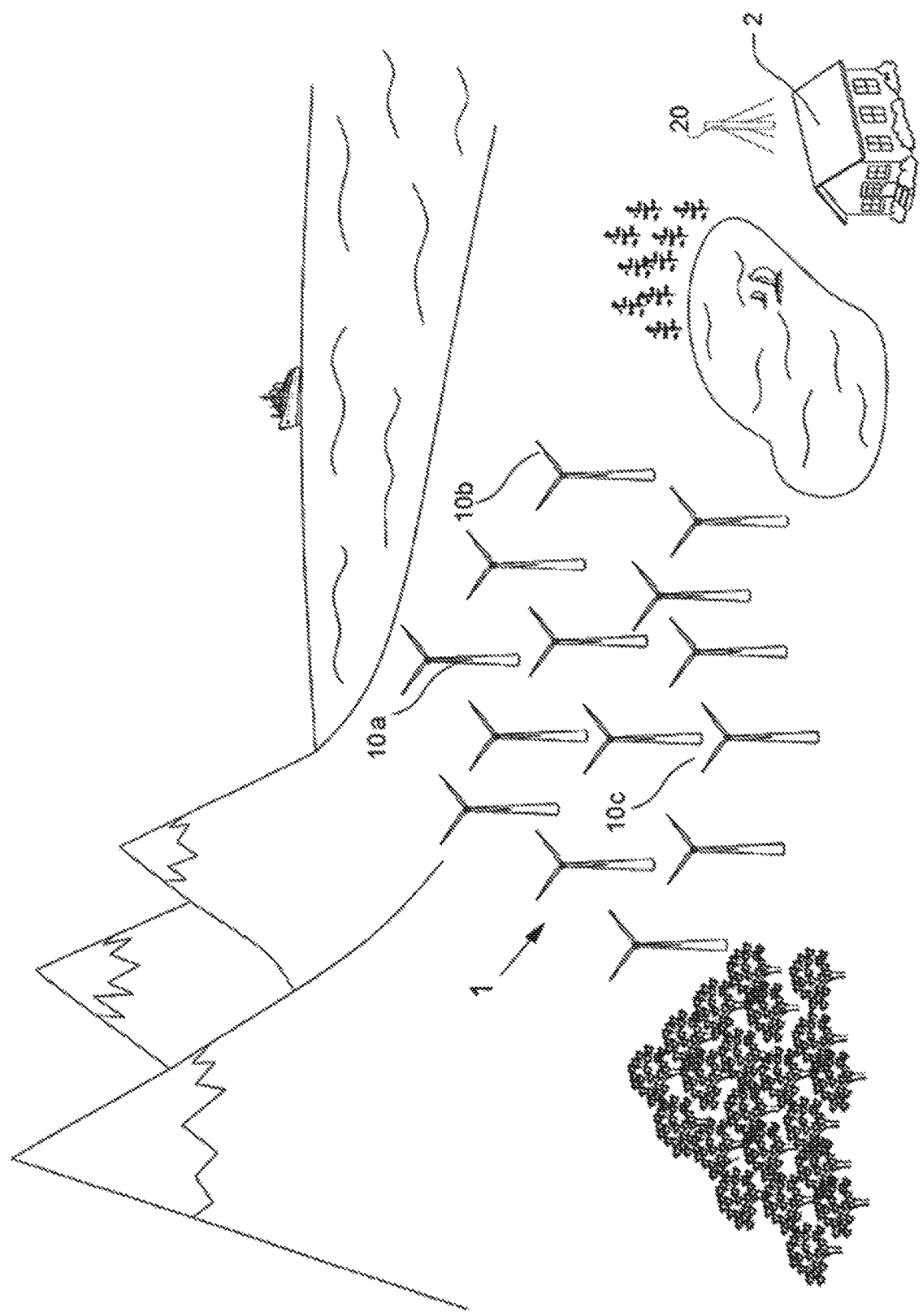
FIG. 1 is a perspective view of a landscape with a wind power plant.

FIG. 1 illustrates a wind power plant (1) including a number of wind turbines (10a, 10b, 10c) and a neighbouring area (2) in which wind turbine noise is audible. For the purposes of implementing the present invention, the wind power plant (1) can have any number of wind turbines greater than or equal to one, and the wind turbines can be wind turbine models known in the art.

In the vicinity of the neighbouring area (2) there is a microphone (20) configured to capture noise data, including data representative of the noise produced by one or more of the wind turbines (10a, 10b, 10c) of the wind power plant. The microphone captures noise data over an extended time period with a suitable sampling rate, for example in accordance with the procedure described in the third edition of IEC 61400-11.

The noise data captured by the microphone (20) is communicated from the microphone for analysis. For example, it may be communicated to one or more computers (not shown) that analyse data for, and/or control the operation of, one or more of the wind turbines (10a, 10b, 10c) of the wind power plant. Such computers may be internal or external to the wind power plant, and may be associated with one or more than one of the wind turbines of the wind power plant. That is, each wind turbine may be associated with one or more dedicated computers, or a plurality of wind turbines may share the one or more computers.

While FIG. 1 only shows one microphone (20), there may be additional microphones at other positions. The noise data for the additional microphones can also be communicated for analysis. Separate channels of noise data may be treated independently or may be aggregated to produce a single noise dataset. In some embodiments, there may be one or more microphones for each wind turbine.

Operating parameters of the one or more wind turbines (10a, 10b, 10c) may also be measured by appropriate sensors and recorded over time. For example, the operating parameters may include the following.

Generator RPM—a measure of the rate of rotation of the generator rotor in rotations per minute (RPM).

Generator RPM variation—the variation in the generator RPM measured over a period during the wind turbines operation.

Pitch—the angle of attack of the blades with respect to the wind.

Pitch variation—the variation in the pitch measured during a period of the wind turbine operation.

Power/torque—the power generated by the wind turbine, which is directly related to the torque in a manner known in the art.

Power/torque variation—the variation in the power/torque measured during a period of the wind turbine operation.

Yaw angle—the angle of rotation of the nacelle around its vertical axis.

Yaw angle variation—the change in yaw angle over time.

Rotor RPM a measure of the rate of rotation of the rotor blades in rotations per minute (RPM) (the rotor rpm could be computed from generator rpm, however sometimes it might be of interest to bin along rotor rpm if multiple gear ratios are available for a particular turbine variant)

Rotor RPM variation—the change in rotor RPM over time.

The noise parameters may include the following:

Maximum tone level—the maximum tone level measured in dB obtained from the noise data at a given RPM. Tone level may be obtained from the noise data in manners known in the art, for example in accordance with the IEC standard.

Tonal energy—the energy contained in a tone.

Masking energy—the noise or the energy in the noise that masks tonality.

% heard—the percentage of the tonal noise heard by neighbors to the wind turbine.

Number of peaks (and their corresponding frequency) in the critical bandwidth, which potentially identifies the different source components responsible for tonality Noise parameters suitable for use with embodiments of the invention are described in IEC 61400-11.

Further factors that may be considered include operation of the turbine, such as mode of operation (e.g. a controlling strategy having a particular set or range of operating parameters), yaw angle, yaw error and controller settings, day-to-day variation in the collected data, measurement of the data over multiple days, overall amount of data collected, width (broadness) of peak in the collected noise data, number of tone lines calculated for the noise data and number of peaks present in the noise data. Further operating parameters may also be measured by appropriate sensors and recorded over time. Examples include operating conditions such as wind speed, wind speed variation, wind direction and wind direction variation. Operating parameters represent the aspects of a wind turbine that can define that turbine's operation. Operating parameters, in the context of the invention, can also include conditions that represent factors experienced by the wind turbine during operation. For brevity, the term operating parameters may be understood to include noise parameters, operating parameters and operating conditions.

Wind turbine operating parameter data representative of any of these parameters may be communicated for analysis. For example, the wind turbine operating parameter data may be communicated to the computer(s) to which the noise data is communicated. The operating parameter data comprises a set of values of each operating parameter of the wind turbine. For example, operating parameter data associated with the generator RPM of the wind turbine may be streamed to a computer. This data forms a set of values, which indicate the RPM at which the wide turbine is operating over the period in which the parameter is measured.

Figure 2:
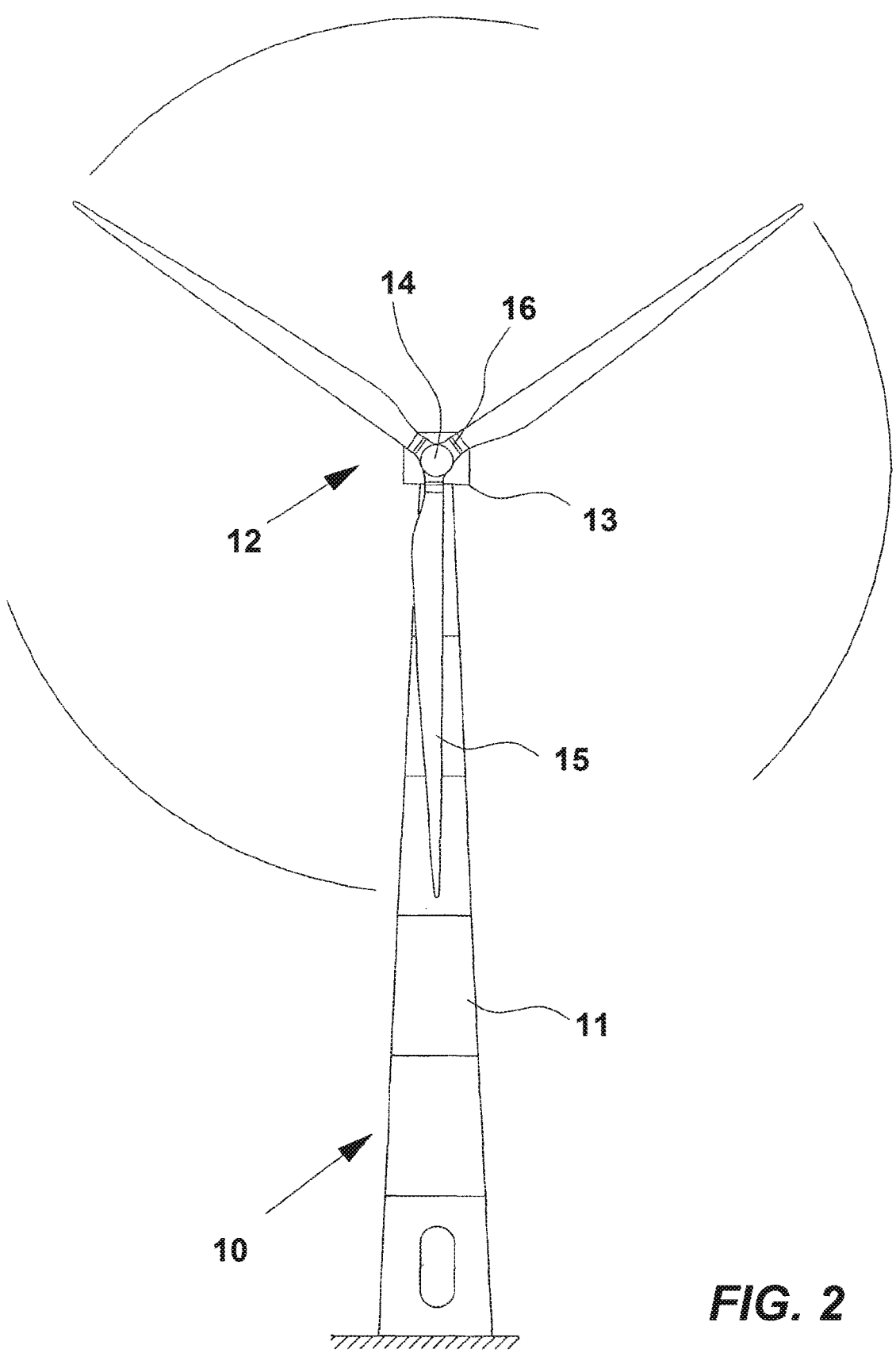
FIG. 2 is illustrates a large modern wind turbine.

FIG. 2 illustrates a large modern wind turbine (10) as known in the art, comprising a tower (11) and a wind turbine nacelle (13) positioned on top of the tower. Wind turbine blades (15) of a turbine rotor (12) are mounted on a common hub (14) which is connected to the nacelle (13) through the low speed shaft extending out of the nacelle front. The wind turbine blades (15) of the turbine rotor (12) are connected to the hub (14) through pitch bearings (16), enabling the blades to be rotated around their longitudinal axis. The pitch angle of the blades (15) can then be controlled by linear actuators, stepper motors or other means for rotating the blades. The illustrated wind turbine (10) has three turbine blades (15), but it will be appreciated that the wind turbine could have another number of blades such as one, two, four, five or more.

Figure 3:
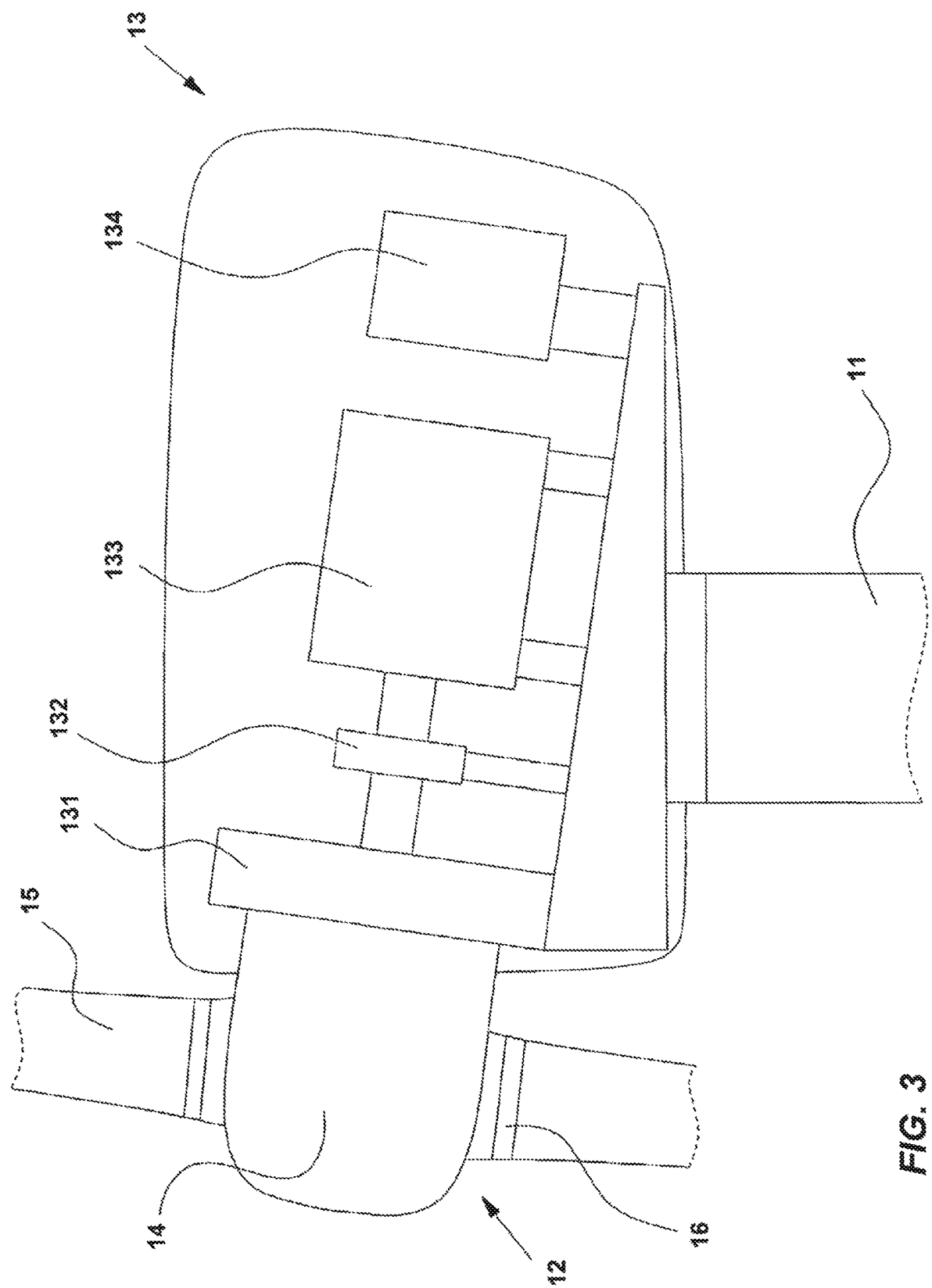
FIG. 3 illustrates a simplified cross section of a nacelle, as seen from the side.

FIG. 3 illustrates a simplified cross section of an example nacelle (13) of a wind turbine (10), as seen from the side. The nacelle (13) exists in a multitude of variations and configurations but in most cases comprises one or more of following components: a gearbox (131), a coupling (not shown), some sort of braking system (132) and a generator (133). A nacelle can also include a converter (134) (also called an inverter) and additional peripheral equipment such as further power handling equipment, control cabinets, hydraulic systems, cooling systems and more.

Figure 4:
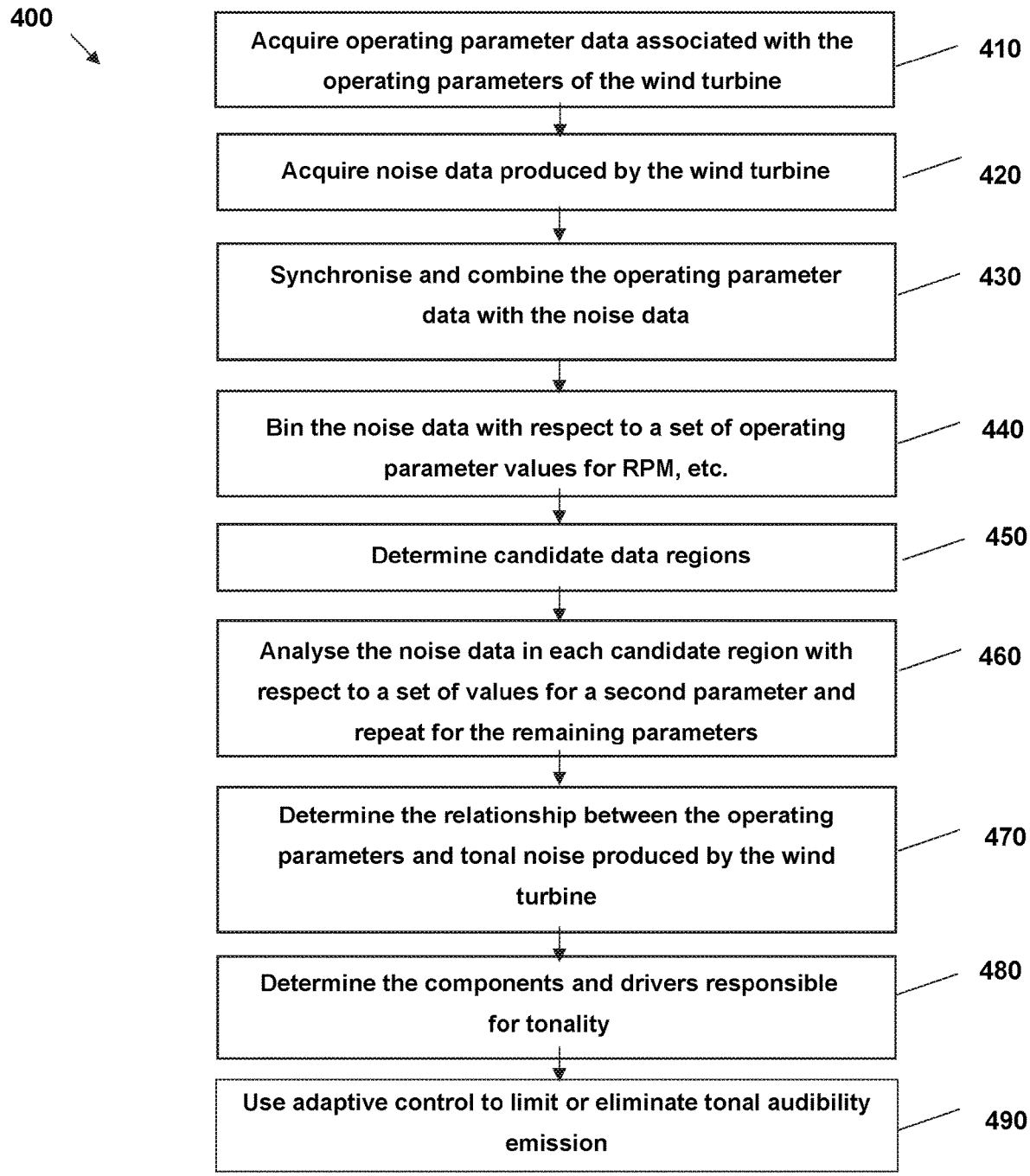
FIG. 4 is a flow chart illustrating a method of analysing wind turbine noise.

FIG. 4 is a flow diagram illustrating a method (400) of analysing wind turbine noise according to an embodiment of the present invention. Noise data is collected by the microphone (20). This data represents the noise emission of a wind turbine over time when in operation. At the same time, operating parameter data associated with a plurality of operating parameters of the wind turbine may be recorded. At steps (410) and (420), the noise data and the operating parameter data are communicated to a computer for analysis. Although the step representing the acquisition of operating parameter data (410) is shown before the acquisition of the noise data (420), it should be appreciated that the order at which the data is acquired is unimportant. For example, whilst noise data is being collected and communicated to the computer, the wind turbine operating parameter data may be simultaneously streamed to the computer.

At step (430), the noise data is time-synchronised with the operating parameter data such that each data point of the noise data corresponds to a particular value of each operating parameter at which the wind turbine was operating when the noise measurement was taken. In this way, each noise data point is associated with a number of operating parameter values, with each value being associated with a different parameter of the wind turbine. Thus, the parameter values associated with each noise data point are indicative of the operation of the wind turbine at the time the recorded noise was emitted.

Here, the noise data is time-synchronised with the set of values of each operating parameter listed previously. However, it will be appreciated that the noise data may be time-synchronised with fewer parameter sets. For example, the noise data may only be time-synchronised with the set of values associated with RPM, the set of values associated with power and the set of values associated with pitch. The exact number of parameter sets used in this way may be determined by computational constraints or the particular requirements of a given investigation.

While the time-synchronisation has been described as being performed once the data has been communicated to the computer, the data may alternatively be time-synchronised at the point of measurement. In such a case, each noise data point is measured simultaneously with its corresponding parameter values and communicated together to the computer.

The noise data and the operating parameter data are combined, also at step (430), to produce data representing noise produced by the wind turbine as a function of the wind turbine operating parameters. The noise data may be combined with any operating parameter for which the time-synchronisation described above has been performed. The noise data may be combined with a set of values for a single operating parameter at step (430), and may optionally be combined with additional operating parameters later in the method, for example at step (450) which is described below. Alternatively, the noise data may be combined with each time-synchronised operating parameter at this step, providing the noise data represented separately as a function of each synchronised operating parameter.

Figure 5:
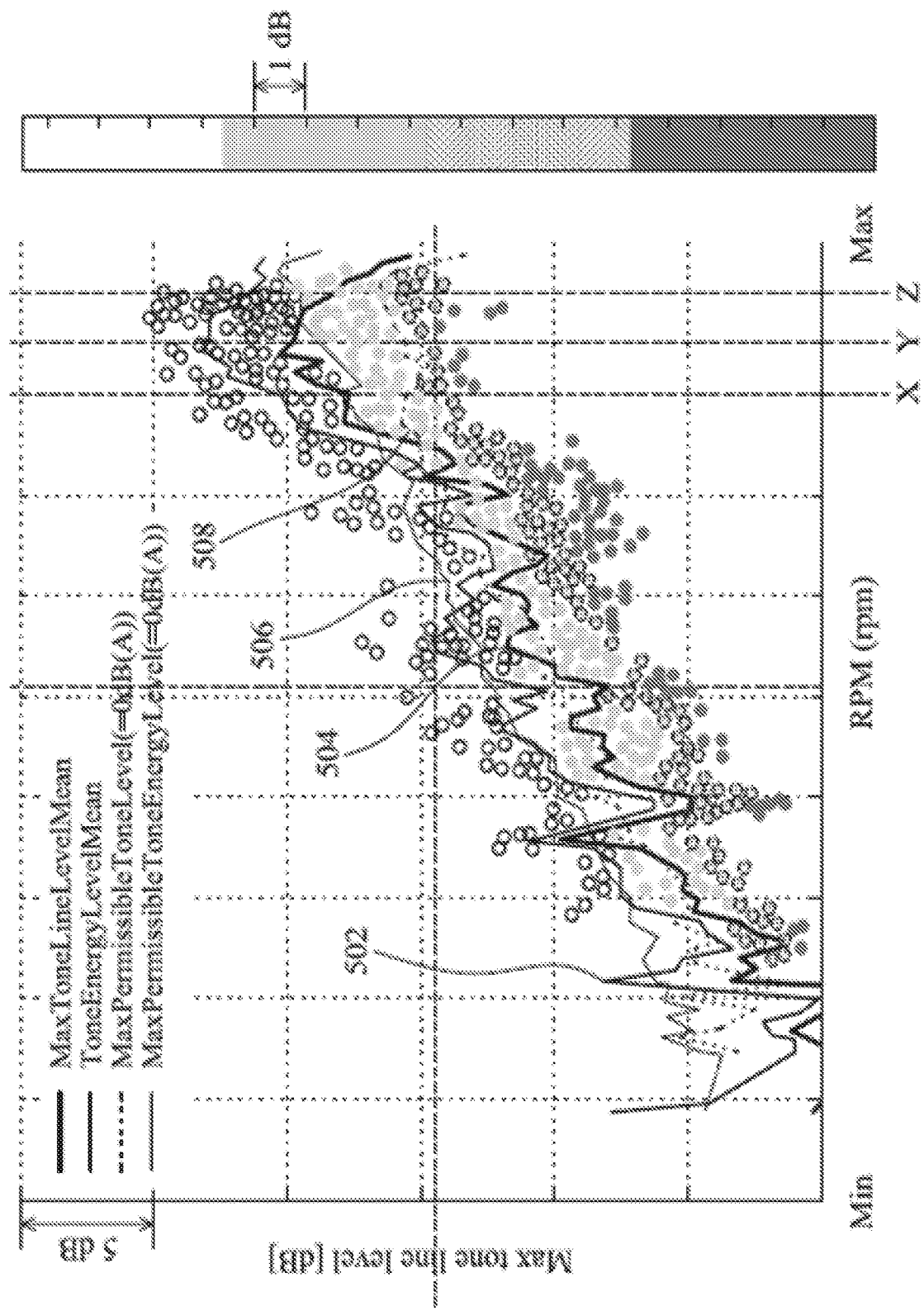
FIG. 5 illustrates exemplary noise data and a method of identifying a region of noise data that is a candidate for containing noise data indicative of unacceptable tonal noise.

In the present embodiment the noise data is combined with RPM data, for example, at step (430) to give data representing the noise produced by the wind turbine as a function of the RPM of the wind turbine, as is shown in FIG. 5. As described above, as an alternative or in addition to RPM, any number of the remaining parameter data sets may be combined with noise data at this step.

At step (440), the noise data is binned with respect to a set of values of a first operating parameter for which the above time-synchronisation and combining has been performed. The process of binning comprises arranging the noise data into a discrete number of groups, here described as bins, defined by ranges of the operating parameter values. The bin width is defined by the difference between the largest and smallest value of the operating parameter for that bin, and all noise data points falling within these two values are associated with that bin. Arranging the data into bins in this way allows the noise data to be arranged into smaller more manageable portions. Each bin, and the noise data contained therein, can then be analysed, allowing for the identification of exactly where the tonal noise lies in relation to the parameter values, which in turn allows for the correlation of the tonal noise with the parameter, and potentially the component, that generated it, as explained further below.

In the present example, the noise data is binned with respect to RPM because tonal noise is sensitive to this parameter. Therefore, by examining noise data over a given RPM range (i.e. an RPM bin), variations in tonal noise levels can be seen, identified and analysed. It should be appreciated however that any other parameter for which tonal noise is sensitive could be used for binning, for example power, pitch, torque, tonal audibility, tone level, masking, frequency etc.

Here, the data is organised into bins of equal size or width. Determining the width of each bin may be done in a number of ways, and the exact bin width used will generally depend upon the objectives of a particular investigation, and on the sensitivity to the source, with bin widths being selected that correlate with tonal generation. For example, if an investigation is directed towards noise data collected over a narrow range of parameter values, the bins may be set to be narrow. If a broad representation of tonal noise across a large range of parameter values is desired then wider bins may be more appropriate. Generally, however, a balance is needed. A bin width which is too narrow may lead to reduction in amount of data in each RPM bin and thus the correlation between the noise data and the parameter would be affected. This would also be visible with huge fluctuations from one bin to another in tonal noise values. In contrast, if the bin is too wide then it may average out some of the parameters that might potentially be the drivers for turbine tonality. The bin width may be a pre-set parameter selected for the particular investigation, or it may be associated with the parameters of the wind turbine by an appropriate function and calculated accordingly. For example, the bin width may depend on the range of generator RPM, power, pitch etc. under investigation.

As a particular example, when binning with respect to generator RPM, a bin width of between 1 and 100 rpm may be used. More specifically a bin width of between 5 and 50 rpm may be used. Even more specifically, a bin width of between 8 and 15 rpm may be used. It has been found during experimentation that a bin width of 10 rpm, or about 10 rpm, is particularly useful at least as a starting value.

Once an optimal bin width has been established for the bins, the method of the present embodiment then performs the step (450) of analyzing the noise data contained within each bin to determine regions of data that are candidates for containing noise data indicative of unacceptable tonal noise. A candidate region may be a single bin or multiple bins, and will depend on the nature of the noise data and the bin widths. The bin or bins within a candidate region may be referred to as candidate bins. This step may be used to reduce the computational expense of the analysis by reducing the amount of data that is analyzed. Step (450) will now be described with reference to FIG. 5.

FIG. 5 shows an exemplary data set which illustrates a method of performing step (450) according to the present embodiment of the invention. Here, each noise data point is represented by a tone level value measured in dB. A corresponding tonal energy level could be similarly provided, which indicates the amount of energy associated with the measured tone level across the width of the bin. The tone level values and the corresponding energy levels are obtained from the measured noise data in a manner known in the art, for example in accordance with the IEC standard. The tone level values are combined with their time-synchronised RPM values, providing tone level plotted along the y-axis and each data point's corresponding RPM value plotted on the x-axis. The "Min" and "Max" are simply intended to show the range of data analysed; the minimum value could go to 0 rpm and the maximum value to over speed, for example, should that full range of data be acquired and analysed. A colour or other indicator (in FIG. 5 different levels of shading) can be used to indicate the tonal audibility value for each of the measured spectra. As can be seen, there are generally a plurality of data points for each value of RPM. This is because many noise measurements were taken as the wind turbine operated at these frequencies. A high density of data points, for example between Y and Z rpm, represents RPM values at which the wind turbine was regularly operating. As such, many measurements were taken within that range. Further, the data points have been binned into RPM bins, each with a bin width of 0.10 rpm, as an example. This bin width is identified in step (440), as described previously.

In some embodiments the analysis may be limited to areas of the first parameter having a high density of data points, such as the Y to Z rpm range in the example above, or sub-binning may be performed in this area such that a higher resolution can be achieved in the operating region in which the turbine spends most time during operation. A high density of data points may be determined based upon a threshold of data points.

Step (450) starts by averaging and quantising the continuum of noise data points such that, for each bin, a tonal property of the data points within that bin can be represented by a single value indicating the level of tonal noise within that bin. In the present embodiment, a mean maximum tone level value and a mean maximum tonal energy level value are calculated for each bin. These values indicate the average value of the maximum tone levels and tonal energy levels that were measured for the bin. These mean values can then be plotted against RPM, as shown in FIG. 5 by the two solid lines (502) and (504). The higher solid line (502) represents the mean maximum tonal energy of each bin across the entire RPM range and the lower solid line (504), i.e. the line tracking beneath line (502), represents the mean maximum tone level of each bin across the RPM range.

Once these values have been calculated and plotted, they can be compared to appropriate thresholds. Here, the thresholds are the maximum permissible tonal energy and maximum permissible tone level of a bin. These threshold values are also plotted across all bins, as shown by the dashed lines (506) and (508) respectively. The maximum permissible tone level represents the highest possible tone level that a wind turbine may produce at a particular RPM before the tonal noise becomes unacceptable, for example, it becomes audible at the position of the microphone (20). Similarly, maximum permissible tonal energy represents the most tonal energy the tonal noise may contain before it becomes unacceptable. These quantities may be calculated in a manner known in the art. For example, by calculating the value of the tone energy level which produces a tonal audibility of zero when masking noise is taken into account. Such quantities may be calculated, or reverse calculated using the IEC standard, for example. Tonality is given by $\Delta Ltn, j,k = Lpt, j,k - Lpn, j,k$. Tonal audibility is given as $\Delta La,j,k = \Delta Ltn, j,k - La$. Here, Lpt is tonal energy, Lpn is masking energy and La is frequency dependent audibility criterion.

According to the present embodiment, candidate regions are then identified by comparing the mean maximum tonal energy level line (502) and the mean maximum tone level line (504) with their corresponding threshold lines. The areas in the data where the thresholds are exceeded may be set to be equal to candidate regions, with the bins contained therein set to be candidate bins. For example, a candidate region may be determined to be a bin which has a mean max tonal energy level and a mean max tone level that exceed their respective threshold values (i.e. are each above the corresponding point on line (506) and (508)). In such a case, if a bin corresponds to a point on one of the solid lines, for example the mean max tone level line, that is above the mean max tone level threshold, but the corresponding point on the other line (mean max tonal energy level) is below the mean max tonal energy threshold, then that bin would not be set as a candidate bin.

Alternatively, both lines may not be required to exceed their thresholds in order for a candidate region to be determined. For example, only one of the mean maximum tone level or the mean tonal energy level may be used, such that if the value exceeds its associated threshold for a given bin, that bin will be identified as a candidate bin.

Consider, as an example, a bin defined between X1 rpm and X5 rpm, for example X1 and X5 may differ by 0.1 rpm. Within this bin there may be a plurality of tone level values associated with each RPM. For example, at a value of X2 rpm, (X2 falling between X1 and X5, e.g. X1+0.01 rpm) the maximum of the maximum tone level recorded may be 30 dB and the minimum value may be 24 dB, with a number of recorded values in between. At a value of X3 rpm (X3 also falling between X1 and X5, but being different to X2, e.g. X1+0.05 rpm), the maximum may be 28 dB and the minimum may be 23 dB. Thus, an average value of the maximum tone level may be calculated by energy summing the maximum tone level value that was measured at each RPM value within the bin and then dividing by the number of maximum values within the bin. Thus, each bin may be associated with a mean maximum tone level, which indicates the average value of the maximum tone levels that were measured between X1 rpm and X5 rpm. In a similar fashion, the mean maximum tonal energy level for a given bin may be calculated for each bin.

These values are then compared to their thresholds. In this example, where the mean values of maximum tone level and tonal energy level exceed the thresholds for a given bin the bin is set to be a candidate bin. If the candidate region extends across only one bin, the candidate region may be set to be equal to the candidate bin. In some cases, however, the candidate region may extend across more than one candidate bin. This may be because a peak which exceeds its threshold may do so in consecutive bins such that the width then is greater than the width of a single bin. Alternatively, a candidate region may have more than one peak, with the peaks extending across more than one bin.

At this point, the method has identified the candidate regions of the data set that are likely to be indicative of unacceptable tonal noise. In other words, noise measurements have been taken for the wind turbine that indicate the wind turbine was emitting annoying tonal noise when operating at the RPMs covered by the identified candidate bins. However, for each noise measurement, the wind turbine may have been operating at various other different operating parameters such as a different power, pitch, mode of operation etc. Thus, although it can be determined that certain RPM values may result in the wind turbine emitting unacceptable tonal noise, further analysis must be performed on these regions to establish which operating parameters are driving generation of the tonal noise.

For the avoidance of doubt, it could also be that the data is binned with respect to any of the other operating parameters and at any given value of that operating parameter, such as power, pitch, etc., that the turbine emits unacceptable noise. Further analysis is then performed to identify which of the remaining operating parameters are driving generation of the tonal noise. Similarly the source components for tonal noise can be identified. As an example, this can be achieved by determining the number of identified peaks in the critical band of each spectrum from the acquired noise data. Some of the source components for tones have frequencies which are directly proportional to rpm or in other words are linearly dependent on speed. It could be that two different source components sum up tonal energy in the critical band. The analysis can be used to identify the exact source components and quantify the contribution from each, in case the frequencies are separated from each other.

Analysis to determine the parameters driving tonal noise is performed at step (460). In this step, values of the set of operating parameter values for a second operating parameter (i.e. an operating parameter other than the first operating parameter, which in this example is RPM) that have corresponding RPM values falling within a candidate region are considered. In other words, a sub-set of the set of values for the second operating parameter are used. The sub-set of values are the values that fall within the candidate region. In the present example the second operating parameter is the power of the wind turbine, although any other operating parameter may be used.

The variation of the parameter, and more particularly the variation in the sub-set of power values, across a given candidate region is compared to, and correlated with, the variation in the tonal noise within the candidate region. This analysis may be performed on a bin by bin basis for each bin falling within a candidate region. Alternatively or in addition, if a candidate area contains more than one bin, then the entire candidate region may be analysed at once. In the present embodiment, each candidate bin is analysed individually.

The correlation may be performed by any appropriate correlation technique, as would be clear to those skilled in the art. For example, the magnitude of the difference in the values of the power that were measured in the bin may be compared to a corresponding magnitude of the difference in the noise data. If a large variation in the power is accompanied by a large variation in tonal noise, this is an indication that the power may be driving, or at least contributing, to the generation on the tonal noise. If there is a large variation in the tone level within the bin, but the power was constant over the RPM range for the bin, then it is clear that the power is not driving tonal noise within this bin.

In the present embodiment, this correlation is represented by a correlation coefficient. This coefficient is calculated for the power parameter as a result of the comparison between the variation in power values and noise data in the RPM bin. Here, the larger the value of the correlation coefficient the stronger the correlation between the variation of the power and the variation in the noise at that particular value of RPM. Thus, the larger the value of the correlation coefficient, the more sensitive tonal noise emission is to variations in that parameter.

This process may then be repeated for each operating parameter, such that every operating parameter has a correlation coefficient representing that parameter's contribution to tonal noise generation within the bin. Further, this process may be repeated for each candidate bin. As such, each parameter will have a correlation coefficient for each bin of interest. Thus, a correlation coefficient of a parameter for a particular bin represents that parameter's contribution to the generation of tonal noise within that bin. It should be noted that a given parameter may have a high correlation coefficient for one RPM bin and a low correlation coefficient for a second RPM bin. This is because a given parameter may become tonally sensitive for one or more particular values of RPM (or other first parameter) and remain relatively tonally insensitive for the remaining RPM values.

Once the correlation coefficients are calculated, step (470) is performed to determine the relationship between the parameters and the tonal noise produced by the wind turbine. This may be done by weighting the operating parameters having a correlation with tonal noise according to their strength of correlation. In some embodiments, the factor by which a given operating parameter is weighted for a particular bin may be dependent on the correlation coefficient for that operating parameter in that particular bin. The weighing defines a relationship between the operating parameters and tonal noise produced by the turbine.

At step (480), the method determines the particular values of each operating parameter that are responsible for tonality in each bin. This may be done by comparing the weight of a given parameter in a bin, or the corresponding correlation coefficient, to an appropriate threshold. For example, a threshold may be set for a correlation coefficient of a parameter. If the correlation coefficient for a given bin exceeds the threshold then the operating parameter associated with that coefficient is determined to be responsible, at least in part, for the generation of tonal noise within the bin. The subset of parameter values associated with that correlation coefficient may be described as the source and/or driver of the parameter for that bin (i.e. the component values of the set of parameter values that are a source or driver of the tonal noise generation). All "sources" for each parameter across all candidate bins can be determined. Particular source components may be identified by their RPM bin and the frequency of the tonal noise they have contributed to generating. Thus, for any given RPM (or other operating parameter as appropriate) of a wind turbine when in operation, the sources and source components which may be driving the generation of unacceptable tonal noise can be identified.

Once this analysis has been performed, the wind turbine can be controlled and adjusted at step (490) to avoid these particular combinations or sets of operating parameter values and thus ensure that tonal noise is reduced or avoided altogether. Embodiments therefore provide a method of turbine control that adjusts one or more turbine operating parameters, based upon the analysis performed to identify relationships between operating parameters and tonal noise, to reduce tonal noise. This control may be applied separately to the results of the analysis, using the results to formulate an appropriate control strategy to avoid or reduce tonal noise. The control may be applied to turbines based on an analysis performed on a different turbine, such as a test turbine.

In particular, the operational parameters of the turbine may be controlled and adjusted to avoid the wind turbine operating at any of the identified "source" values, thus reducing or even eliminating tonal noise emission. Alternatively or in addition, the operating parameters of the wind turbine may be adjusted to increase the masking noise of the turbine. For example, if the tonal noise cannot be adequately reduced, the RPM and/or pitch of the turbine may be adjusted such that the overall noise output of the wind turbine increases. This increase may mask the annoying tonal noise emission such that it is not heard by the turbine's neighbours. The parameters that are adjusted to increase the masking noise are chosen such that their adjustment does not result in an increase in the total noise generated by the wind turbine, or results in a minimal increase. This can be achieved by ensuring that an adjustment to a parameter increases masking noise whilst avoiding any parameter values that are sources of tonal noise. As the above method identifies all the critical areas for tonal noise generation along with the operating parameters that are responsible, the parameters can be adjusted to provide an optimal increase in masking noise whilst providing the minimum possible tonal noise generation. The masking noise may be further increased by suitable add-ons as is known in the art.

Further examples are possible, by which the turbine operating parameters may be controlled to add masking noise to the noise output of the wind turbine. Noise emitted by one or more turbine cooling fans may be controlled, such as by varying the speed of one or more cooling fans. This may also, or alternatively, include a speaker or other noise output device being used to output predetermined masking noise, which may be based upon analysis of turbine tonal noise output.

The wind turbine's operating parameters may be controlled and adapted from any of the computers described previously. Further the parameters may be controlled automatically based on the analysis. For example, once all sources of tonal noise have been identified, the computer may monitor the RPM at which the wind turbine is operating and actively adjust one or more of the other operating parameters such that the wind turbine does not operate at any of the source values. Alternatively or in addition, the computer may adjust the operating parameters such that the masking noise of the wind turbine increases to obscure any tonal noise that may be emitted. This active adjustment may, alternatively or in addition, be performed manually by an operator.

Generally, the wind turbine may be controlled by a wind turbine controller that is associated with one or more than one wind turbine of a wind power plant. Steps of the method may take place in the controller, or may be split between the controller and one or more computers that are in communication with the controller. Wind turbine operating parameters are adjusted based upon the relationship(s) between tonal noise and component operating parameters determined according to the analysis described herein to avoid values of operating parameters occurring that are related to tonal noise. The wind turbine operating parameters are adjusted to reduce or avoid tonal noise production by the wind turbine, or to add masking noise. Control may be asserted to avoid the wind turbine entering particular operational envelopes, or sets of values for turbine operating parameters, that result in tonal noise as determined by the analysis. The control may further take into account a predetermined operational envelope that satisfies one or more predetermined operational constraints. In particular, an operational envelope may be defined separately to the embodiments described herein, taking into account one or more constraints such as aero-noise constraints, wear constraints, load constraints and power output constraints. Such constraints may depend, for example, on time of day (additional aero-noise constraints may exist during the night) and wind speed. The one or more operating parameters may be adjusted to reduce or avoid tonal noise production while also remaining within the operational envelope, and may also be adjusted so as to maximise energy production while remaining within the operational envelope.

In general, there will always be some degree of tonal noise generated during the operation of the wind turbine. However, as exemplified above, smart control of the wind turbine which minimises the impact of such generation can be achieved. This can be done by i) controlling the operating parameters of the wind turbine such that the source parameter values of those operating parameters are avoided and ii) adjusting the operating parameters to increase the masking noise whilst providing the minimal possible tonal noise generation.

As mentioned above, any given candidate region may have more than one bin that is indicative of unacceptable tonal noise. In such a case, each parameter may have a correlation coefficient associated with each candidate bin within the candidate region. The correlation coefficients of each bin may then be used separately in the analysis. For example, in the candidate region between X and Y rpm of FIG. 5, the first peak of line (504) may reside in a first bin and the second peak may reside in a second bin. The method may use the correlation coefficients for the first bin to determine that the first peak has been generated by a tonal noise correlation with an associated power value (or values), and similarly may determine using the correlation coefficients of the second bin that the second peak is associated with a tonal noise correlation with an associated pitch value (or values). Such separate analysis of the candidate bins within a candidate region allows the method to determine exactly which parameters are responsible drivers for each peak. It also can be used to distinguish if the same "source" is responsible for tonality or if the second peak has tonal energy contribution from more than one source or source component (or likewise for the first peak). This can be identified by looking at the number of tone lines, number of peaks and their frequency in the critical band. The critical band is defined in the IEC standard.

Alternatively, or in addition, the coefficients may be averaged across the region of interest. This gives an average coefficient for that parameter that is representative of the overall correlation of that parameter with tonal noise for the entire region. This average value may then be compared with a threshold to determine if the parameter contributes to the generation of tonal noise when averaged across the region.

Thus, by quantising the continuum of RPM values into discrete bins and calculating average noise values for each bin, the method is able to identify the regions of interest in which tonal noise drivers may reside. Further, the subsequent analysis with respect to further parameters (including tonal energy, max tone level, width (broadness) of peak, number of tone lines and number of peaks evaluated in critical band), allows the method to identify if there is only one source or source component or if the tonal audibility is a combination of a number of peaks from different sources or source components which have a different frequency but lie in the same critical band. Therefore, the above method allows for an efficient, reliable method for identifying regions of noise data that may be associated with unacceptable tonal noise and allows for the easy identification of the parameter or parameters that contribute to the unacceptable noise emission of the wind turbine.

The methods described herein may be used in the design or optimisation of one or more turbine component parts. In particular, the results of the methods described herein may be used to define focus areas where the performance of identified source components might need improvement, such as by means of minor design changes. The focus areas are defined by the determined relationship(s) between tonal noise and operating parameters. The corresponding source component's operation can be tested and/or analysed for the operating parameter values corresponding to the identified relationship(s) determined according to the described binning method. The design of the component may then be changed, or the component optimised using various optimisation methods, to avoid particular operating parameter values associated with the particular component that can lead to tonal noise. Focus areas could, for example, be certain power/torque and rpm combinations for the component, as identified according to the described methods. For example, where the source component is a gearbox the design change might be optimisation of the gear stage responsible for tonality, or the stiffening of the gearbox housing to avoid particular vibrational frequencies, etc. In other words, the methods described herein may be used for the evaluation of components, such as gearboxes, for tonality from end of line tests, based on critical operation parameters. The needed design changes on components, if any, can then be identified. These methods of optimising wind turbine components may be implemented independently from the methods of identifying operating parameters responsible for tonality described herein, instead using the results of such methods.

It can also be applied to turbine vibration monitoring and control such that either the tonal noise emission is reduced or masking increased such that tonal audibility is effectively reduced by adaptive control fulfilling all operational constraints.

It should be appreciated that further optional steps of the above described method may be performed depending on the investigation and the obtained noise data. For example, after the noise data has been arranged into bins at step (440), it may be determined that there is too much data in a particular rpm bin, which indicates that the turbine was operating there for a long period of time. Thus, it may be needed to reduce computational overhead and/or improve general efficiency to subdivide the rpm bin into different sub-bins with respect to a second operating parameter, for example power, to identify which of the parameters are driving turbine tonality in a given operation range of the turbine. The remaining steps of the method (steps 450-490) may then be performed on the sub-bins as described above.

Further, the width of identified peaks may be analyzed as this method also provides information on how max tone levels and tonal energy are related to the width of peak. The influence from masking energy and pitch angle can also be considered and evaluated.

Although, the present embodiment has been described as including step (450) of determining candidate regions, it should be appreciated that the method could be performed without this step. In this case, the analysis is performed on each bin. The method may be performed in this way under the assumption that every bin is likely to contain some level of unacceptable tonal noise and therefore every bin should be evaluated.

Although embodiments have been described in which the noise data, which includes data indicative of tonal noise, is acquired using one or more sound measuring devices, this is not a requirement. Any noise data that provides an indication of when tonal noise is occurring, and can be synchronised with operating parameter data, can be used. For example, the noise data may be derived from simulation data from one or more turbine noise emission models. Alternatively, or in addition, the noise data may come from one or more external sources such as local data from people near the turbine indicating times at which the turbine is particularly noisy.

The invention claimed is:

1. A method, comprising:
 determining, via a wind turbine control system, operating parameter data associated with a plurality of operating parameters of a wind turbine, wherein the operating parameter data comprises a set of values for each of the plurality of operating parameters obtained during operation of the wind turbine;
 receiving, via the wind turbine control system, noise data indicative of tonal noise produced by the wind turbine, wherein the noise data is time-synchronised with the operating parameter data;
 binning, via the wind turbine control system, the noise data with respect to the operating parameter data corresponding to a first operating parameter of the plurality of operating parameters, wherein binning comprises correlating the noise data and the operating parameter data corresponding to the first operating parameter and arranging the correlated data into a plurality of bins;
 for a first bin of the plurality of bins, analysing, via the wind turbine control system, the noise data of the first bin with respect to the operating parameter data corresponding to a second operating parameter of the plurality of operating parameters;
 determining, via the wind turbine control system, is a relationship between the second operating parameter and the tonal noise produced by the wind turbine based on the analysis; and
 adjusting, via the wind turbine control system, at least one of the first operating parameter or a third operating parameter to increase a masking noise generated by the wind turbine in order to mask the tonal noise indicated in the first bin.

2. The method of claim 1 wherein the binning further comprises:
 determining a range of each of the plurality of bins based on the operating parameter data corresponding to the first operating parameter.

3. The method of claim 1, wherein analysing the noise data of the first bin with respect to the the operating parameter data corresponding to the second operating parameter further comprises:
 determining a set of parameter values of the second parameter, wherein the set of parameter values is time-synchronized with the noise data of the first bin;
 comparing a variation of the set of parameter values with a variation of the noise data of the first bin; and
 determining a correlation between the variation of the set of parameter values and the variation in the noise data of the first bin.

4. The method of claim 3, further comprising:
 determining a correlation coefficient indicative of the correlation between the variation of the set of parameter values of the second parameter and the variation in the noise data of the first bin.

5. The method of claim 4, further comprising:
 determining that the set of parameter values of the second parameter are a source or driver of the tonal noise based upon the correlation coefficient.

6. The method of claim 5, further comprising:
 setting a threshold for the correlation coefficient that indicates a contribution of the second operating parameter to the tonal noise; and
 determining that the correlation coefficient exceeds the threshold.

7. The method of claim 1, further comprising:
 adjusting one or more of the plurality of operating parameters of the wind turbine to reduce the tonal noise based upon cd the relationship between the second operating parameter and the tonal noise.

8. The method of claim 1, further comprising:
 adjusting the second parameter to reduce the tonal noise generated by the second parameter.

9. The method of claim 1, wherein the first operating parameter is RPM.

10. The method of claim 1, further comprising:
 determining that a sub-set of bins of the plurality of bins includes noise data indicative of the tonal noise;
 identifying the sub-set of bins as a candidate region;
 analysing the noise data of the candidate region with respect to the operating parameter data corresponding to the second operating parameter; and
 not analysing non-candidate regions.

11. The method of claim 10, further comprising:
 determining a mean maximum tone level or tonal energy level for each bin of the sub-set of bins;
 comparing each mean maximum tone level or tonal energy level against a corresponding threshold; and
 identifying each bin of the sub-set of bins for which a threshold is exceeded as the candidate regions.

12. The method of claim 11, wherein the threshold is a maximum permissible tone level or tonal energy level for each bin of the sub-set of bins.

13. The method of claim 1, further comprising:
identifying a source component based on the relationship between the second operating parameter and the tonal noise, wherein the source component is a wind turbine component that contributes to tonal noise.

14. The method of claim 13 further comprising: determining an adjustment to a design of the one or more source component based on the relationship between the second operating parameter and the tonal noise.

15. The method of claim 1, further comprising:
adjusting at least the second operating parameter based upon the relationship between the second operating parameter and the tonal noise produced by the wind turbine; and
operating the wind turbine using the adjusted second operating parameter.

16. A wind turbine, comprising:
a tower;
a nacelle disposed on the tower;
a rotor extending from the nacelle;
a plurality of blades disposed at a distal end of the rotor;
a controller, the controller being configured to perform an operation for identifying an operating parameter of the wind turbine that contributes to the generation of tonal noise, the operation comprising:
determining operating parameter data associated with a plurality of operating parameters of the wind turbine, wherein the operating parameter data comprises a set of values for each of the plurality of operating parameters of the wind turbine obtained during operation of the wind turbine;
receiving noise data indicative of the tonal noise produced by the wind turbine, wherein the noise data is time-synchronised with the operating parameter data;
binning the noise data with respect to the operating parameter data corresponding to a first operating parameter of the plurality of operating parameters, wherein binning comprises correlating the noise data and the operating parameter data corresponding to the first operating parameter and arranging the correlated data into a plurality of bins;
for a first bin of the plurality of bins, analysing the noise data of the first bin with respect to the operating parameter data corresponding to a second operating parameter of the plurality of operating parameters;
determining is a relationship between the second operating parameter and the tonal noise produced by the wind turbine based on the analysis; and
adjusting at least one of the first operating parameter or a third operating parameter to increase a masking noise generated by the wind turbine in order to mask the tonal noise indicated in the first bin.

* * * * *

UNITED STATES PATENT AND TRADEMARK OFFICE
CERTIFICATE OF CORRECTION

| | |
|---|---|
| PATENT NO. | : 11,255,310 B2 |
| APPLICATION NO. | : 16/349239 |
| DATED | : February 22, 2022 |
| INVENTOR(S) | : Gupta et al. |

It is certified that error appears in the above-identified patent and that said Letters Patent is hereby corrected as shown below:

On the Title Page

Item (30), in Column 1, in "Foreign Application Priority Data", Line 1, delete "Nov. 13, 2017" and insert -- Nov. 14, 2016 --.

Signed and Sealed this
Seventh Day of June, 2022

Katherine Kelly Vidal
*Director of the United States Patent and Trademark Office*